United States Patent [19]

Courrège

[11] Patent Number: 5,236,241
[45] Date of Patent: Aug. 17, 1993

[54] FLOOR MAT FOR AUTOMOBILE VEHICLE

[76] Inventor: Michele S. G. Courrège, Anse Toiny, P.O. Box 189, 97095 French West Indies, Saint Barthelmy, France, 97095

[21] Appl. No.: 902,583

[22] Filed: Jun. 22, 1992

[30] Foreign Application Priority Data

Jun. 25, 1991 [FR] France .................. 91 07822

[51] Int. Cl.$^5$ .............................................. B60N 3/04
[52] U.S. Cl. ..................... 296/97.23; 15/215; 428/131
[58] Field of Search ............ 296/97.23; 15/215; 428/131, 134, 135

[56] References Cited

U.S. PATENT DOCUMENTS

| | | | |
|---|---|---|---|
| 3,087,752 | 4/1963 | Winchester | 296/97.23 |
| 3,605,166 | 9/1971 | Chen | 15/215 |
| 3,654,657 | 4/1972 | Hubel | 15/215 |

Primary Examiner—Robert R. Song
Attorney, Agent, or Firm—Staas & Halsey

[57] ABSTRACT

This invention relates to a floor mat for automobile vehicle, avoiding wear of the driver's shoes during the driving operations.

The floor mat is composed of a frame and a grid arrangement formed by segments defining openings therebetween. The face of the floor mat turned towards the floor of the vehicle has no bottom. The upper edge of the segments is preferably provided with bristles forming a brush.

17 Claims, 3 Drawing Sheets fig_1
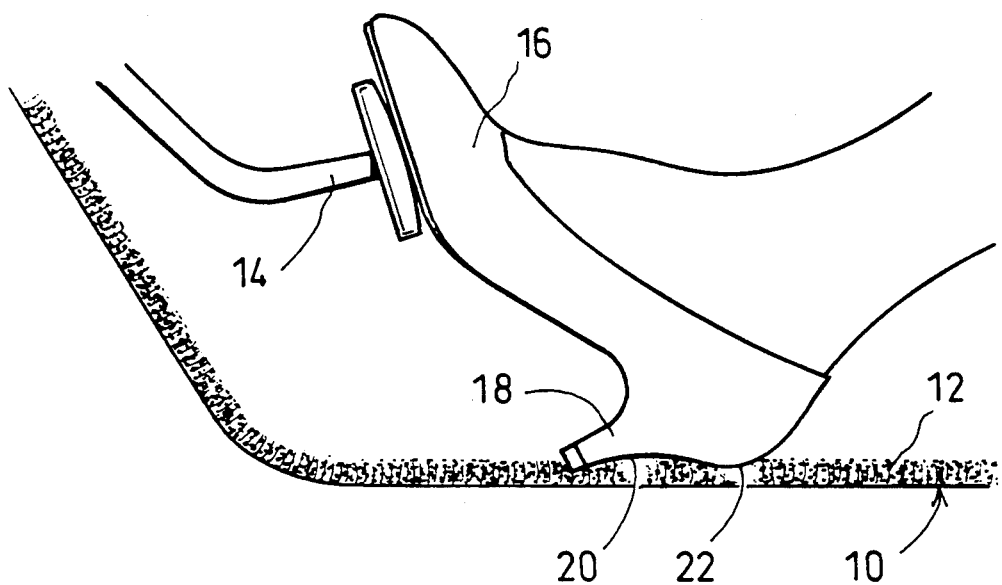
fig_2
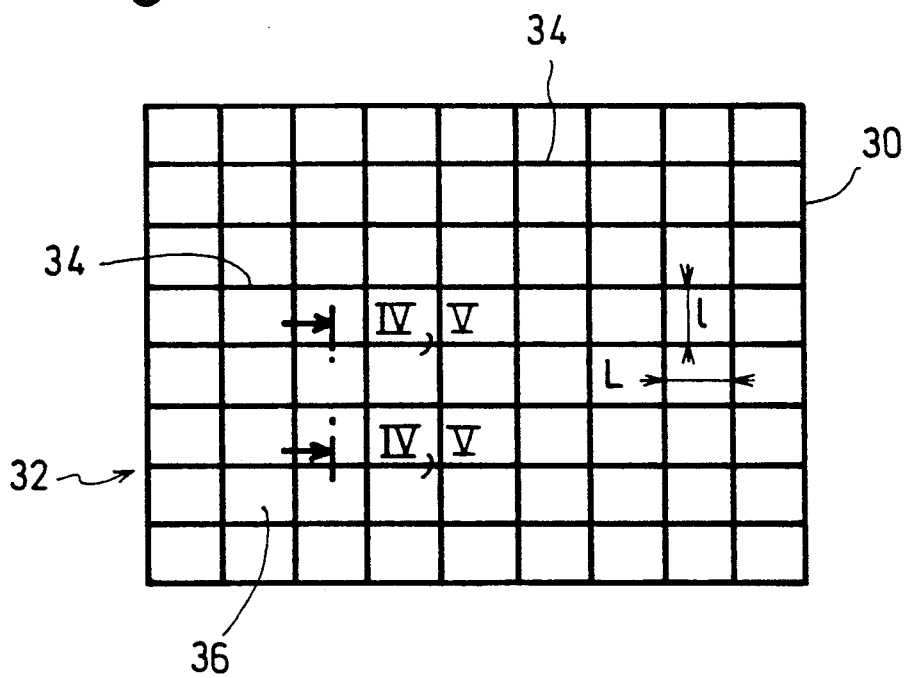

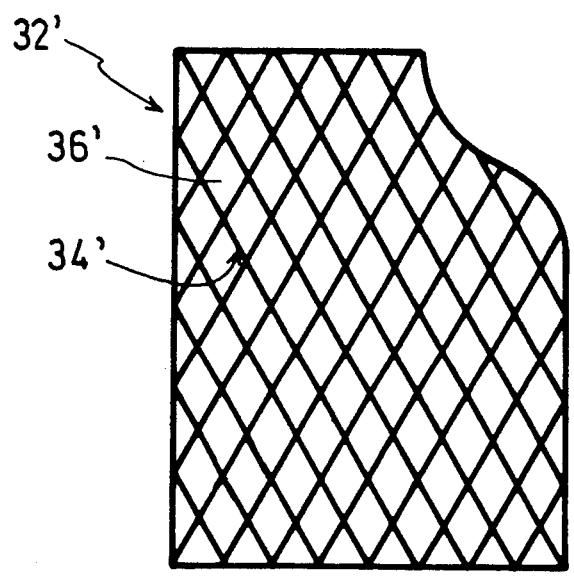
fig_3
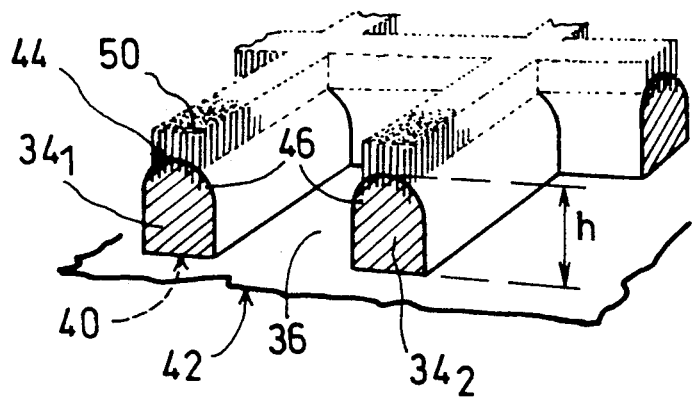
fig_4
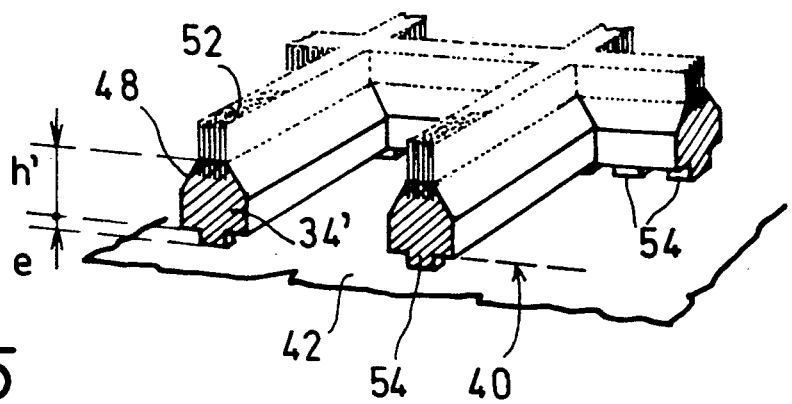
fig_5

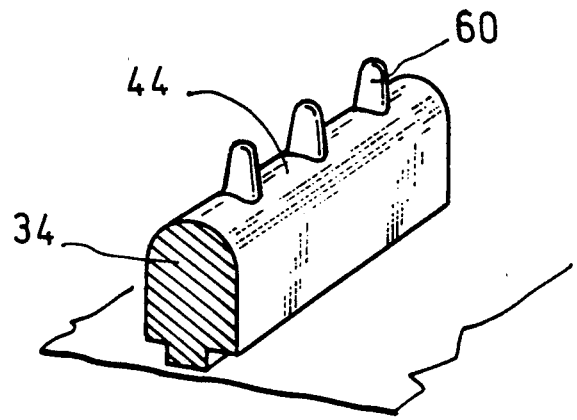
fig_6
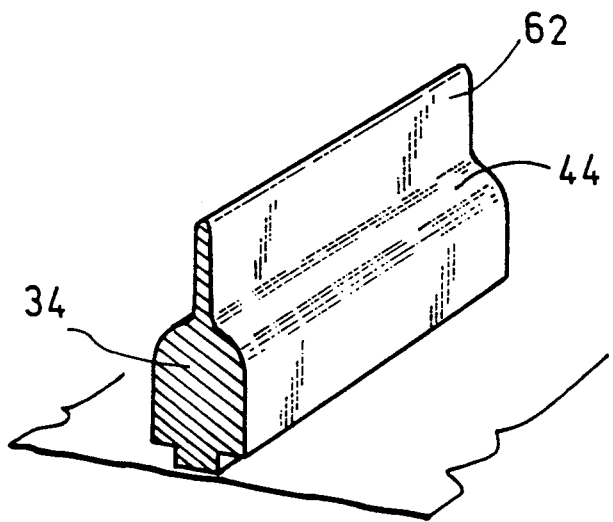
fig_7

FLOOR MAT FOR AUTOMOBILE VEHICLE

FIELD OF THE INVENTION

The present invention relates to a floor mat for an automobile vehicle.

BACKGROUND OF THE INVENTION

A floor mat made of an elastomeric material is known to be often placed on part of the floor of an automobile vehicle, particularly in that area of the floor of the vehicle corresponding to the place where the driver places his/her feet to actuate the pedals of the vehicle. Such floor mats are generally made of an elastomeric material which is relatively deformable in order to take the particular shape of the vehicle floor in this area and in order to protect the floor proper from the wear resulting from the pressure and friction exerted in particular by the driver's heel.

As a general rule, such floor mats comprise some ribs to avoid the point of abutment of the foot which is engaged on the pedals sliding. A drawback of such a floor mat consists in that the driver's soles are often covered with particles of dust, gravel or earth, or any other like materials, and the friction of the heel or sole on the floor mat causes these particles to be deposited on said floor mat. This results in that, under the effect of the relative movements of the driver's shoe with respect to the floor mat, the gravel or like material acts like an abrasive, causing alteration and wear of part of the driver's shoe. This is particularly the case when the driver is a woman wearing high heels. This has been illustrated in accompanying FIG. 1.

In this Figure, reference 10 represents the floor of the vehicle, 12 the floor mat of conventional type, 14 one of the control pedals of the vehicle, and 16 the driver's shoe, this shoe having a heel 18.

As this Figure shows, the rear part 20 of the heel and the upper 22 of the shoe are in contact with the floor mat 12 and are thus subject, by the relative movement, to the effect of abrasion due to the deposit of gravel or sand stagnant on the floor mat 12.

It is an object of the present invention to provide a floor mat for automobile vehicle which overcomes the drawback set forth hereinabove, whilst ensuring comfort for the driver.

SUMMARY OF THE INVENTION

To that end, according to the invention, the floor mat for automobile vehicle is characterized in that it comprises a grid arrangement made of a plastic or elastomeric material and a frame surrounding the grid arrangement, said grid arrangement comprising a first face turned towards the floor of the vehicle and a second face, substantially parallel to the first face, on which the driver's foot rests, said grid arrangement being constituted by segments connected together and defining openings therebetween.

It will be readily understood that, since the floor mat does not have a bottom, the particles of gravel or sand are deposited in the openings made between the grid arrangement, thus avoiding the effect of abrasion.

According to a preferred embodiment, the end of at least certain segments disposed in said second face is provided with bristles, said first face presenting no bottom.

BRIEF DESCRIPTION OF THE DRAWINGS

The invention will be more readily understood on reading the following description with reference to the accompanying drawings, in which:

FIG. 1, already described, is a view in vertical section showing a floor mat of known type.

FIG. 2 shows a plan view of a first embodiment of the floor mat.

FIG. 3 also shows a plan view of a variant embodiment of the floor mat.

FIG. 4 is a view in partial section along line IV—IV of FIG. 2 and in perspective.

FIG. 5 is a view in partial section along line IV—IV of FIG. 2 and in perspective, in accordance with a first variant embodiment; and FIGS. 6 and 7 are views in partial section along line IV—IV of FIG. 2 and in perspective in accordance with a second and a third variant embodiment of the invention.

DETAILED DESCRIPTION OF THE DRAWINGS

Referring again to the drawings, FIGS. 2 and 3 show the floor mat according to the invention which is constituted by a frame 30 surrounding a grid arrangement, bearing general reference 32. The frame 30 and the grid arrangement 32 preferably form one piece obtained by moulding a plastic material or an elastomer presenting the physical properties required, particularly a sufficient deformability in order to follow the shape of the vehicle floor. The grid arrangement 32 is constituted by an assembly of segments such as 34 which are connected together. In the embodiment of FIG. 2, the meshes of the grid arrangement are rectangular and thus define openings 36, likewise rectangular, with sides 1 and L.

According to the embodiment of FIG. 3, the grid arrangement 32' is in the form of diamonds and constituted by segments 34'. The openings 36' are also in diamond form. Other shapes may, of course, be envisaged, such as circles, the segments in that case being circular. The circles are connected together tangentially or via rectilinear segments of short length.

The floor mat and therefore the grid arrangement present a lower face 40 turned towards the floor 42 of the vehicle and an upper face 44 intended to receive the driver's foot. These two faces are substantially parallel. In FIG. 4, the end 46 of each segment 34 opening out in the upper face 44 has a rounded form. On the contrary, in accordance with the embodiment of FIG. 5, the upper end of each segment 34' is bevelled. It is therefore seen that the lower face 40 of the floor mat has no bottom which would obturate openings 36 or 36'.

According to a preferred embodiment, the upper ends 44 and 48 of the segments forming the grid arrangements 32 and 32' are provided with rows of bristles 50 or 52 whose roots are implanted in segments 34 or 34'. According to a variant embodiment of the invention, only a part of the segments is provided with rows of bristles 50. In the case of the floor mat of FIG. 2, for example, only those segments which are perpendicular to the length of the vehicle are provided with bristles. The bristles may be made of straw, strands of jute, rush or, preferably, suitable synthetic plastics material.

It will be understood that, thanks to the invention, during the relative movement of the driver's shoe with respect to the floor mat, the particles such as sand or gravel which may be detached from the shoe are collected in the openings 36 or 36' of the grid arrangement. To that end, the height h or h' of the segments between the upper and lower faces of the grid arrangement is sufficient to allow the sand and other materials to accumulate, avoiding their remaining on the upper face of the segments forming the grid arrangement.

In addition, when the floor mat comprises bristles, an effect of brushing of the shoes is also obtained.

According to an improved embodiment illustrated in FIG. 5, the lower face 40 of the grid arrangement may be provided with projections such as 54 or other suitable protuberances, so that the face 40 is not in direct contact with the floor 42 of the vehicle. This arrangement makes it possible to benefit from the inclined part of the vehicle floor, in the vicinity of the pedals, to evacuate the sand and other particles towards the lower part of the floor and avoid stagnation thereof in openings 36'.

FIG. 6 shows another embodiment of the floor mat and more precisely segments thereof. The upper part 44 of at least certain of the segments 34 is rounded and provided with barbs 60 distributed regularly over the length of the segment. The barbs have for example a height of 5 mm, if the segment has a height of 1 cm, and are separated from one another by about 5 mm. They have a sufficiently reduced diameter to present a certain flexibility. For example, they have a diameter of 2 to 3 mm. It will be understood that these barbs perform the same role as the bristles of the embodiments of FIGS. 4 and 5 but they may be made by moulding at the same time and with the same material as the rest of the floor mat.

FIG. 7 shows another embodiment in which the upper part 44 of the segment 34, or of certain of the segments 34, is provided with a flexible lip 62 extending over the length of the segment. This lip 62 performs exactly the same role as the bristles or barbs and it may conveniently be made during moulding of the floor mat assembly.

In addition, it goes without saying that the frame 30 of the floor mat is not necessarily rectangular. It may advantageously present curved parts which follow the contour of the vehicle floor in the area where the pedals are located.

What is claimed is:

1. A floor mat for automobile vehicle, comprising a grid arrangement made of a plastic or elastomeric material and a frame surrounding the grid arrangement, said grid arrangement comprising a first face turned towards the floor of the vehicle and a second face, substantially parallel to the first face, on which the driver's foot rests, said grid arrangement being constituted by segments connected together and defining openings therebetween, said first face not having a bottom, an upper end disposed in said second face of at least some segments being provided with barbs, whereby the particles detached from the driver's shoes are collected in said openings.

2. The vehicle floor mat of claim 1, wherein said grid arrangement presents openings of rectangular shape.

3. The vehicle floor mat of claim 1, wherein said grid arrangement presents openings in the form of diamonds.

4. The vehicle floor mat of claim 1, wherein said grid arrangement presents circular openings.

5. The vehicle floor mat of claim 1, wherein said grid arrangement comprises protuberances in its first face in order to create a spaced apart relationship between said first face ad the vehicle floor.

6. The vehicle floor mat of claim 1, wherein the upper end disposed in said second face of at least a certain segment is bevelled.

7. The vehicle floor mat of claim 1, wherein the upper end of certain segments disposed in said second face is provided with bristles.

8. A floor mat for automobile vehicle, comprising a grid arrangement made of a plastic or elastomeric material and a frame surrounding the grid arrangement, said grid arrangement comprising a first face turned towards the floor of the vehicle and a second face, substantially parallel to the first face, on which the driver's foot rests, said grid arrangement being constituted by segments connected together and defining openings therebetween, said first face not having a bottom, an upper end disposed in said second face of at least some segments being provided with bristles, whereby the particles detached from the driver's shoes are collected in said openings.

9. The vehicle floor mat of claim 8, wherein said grid arrangement presents openings of rectangular shape.

10. The vehicle floor of claim 8, wherein said grid arrangement presents openings int he form of diamonds.

11. The vehicle floor mat of claim 8, wherein said grid arrangement presents circular openings.

12. The vehicle floor mat of claim 8, wherein said grid arrangement comprises protuberances in its first face in order to create a spaced apart relationship between said first face and the vehicle floor.

13. A floor mat for automobile vehicle, comprising a grid arrangement made of plastic or elastomeric material and a frame surrounding the grid arrangement, said grid arrangement comprising a first face turned towards the floor of the vehicle and a second face, substantially parallel to the first face, on which the driver's foot rests, said grid arrangement being constituted by segments connected together and defining openings therebetween, an upper end of at least some segments disposed in said second face being provided with barbs, said segments having a height between said first and second faces sufficient for the particles detached from the driver's shoes to be collected in said openings.

14. The vehicle floor mat of claim 13, wherein said grid arrangement presents openings of rectangular shape.

15. The vehicle floor mat of claim 13, wherein said grid arrangement presents openings in the form of diamonds.

16. The vehicle floor mat of claim 13, wherein said grid arrangement presents circular openings.

17. The vehicle floor mat of claim 13, wherein the upper end of certain segments disposed in said second face is provided with bristles.

* * * * *

UNITED STATES PATENT AND TRADEMARK OFFICE
CERTIFICATE OF CORRECTION

PATENT NO. : 5,236,241
DATED : August 17, 1993
INVENTOR(S) : Courrège

It is certified that error appears in the above-indentified patent and that said Letters Patent is hereby corrected as shown below:

```
Column 4, line 8, change "ad" to --and--;
Column 4, line 31, change "int he" to --in the--.
```

Signed and Sealed this

Eighth Day of March, 1994

Attest:

BRUCE LEHMAN

*Attesting Officer*   *Commissioner of Patents and Trademarks*